(12) United States Patent
O'Donnell et al.

(10) Patent No.: US 10,563,362 B2
(45) Date of Patent: Feb. 18, 2020

(54) SYSTEM AND METHOD FOR PAVING MACHINE CONTROL

(71) Applicant: Caterpillar Paving Products Inc., Brooklyn Park, MN (US)

(72) Inventors: Timothy M. O'Donnell, Long Lake, MN (US); Eric S. Engelmann, Delano, MN (US); John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/995,688

(22) Filed: Jun. 1, 2018

(65) Prior Publication Data

US 2019/0368135 A1    Dec. 5, 2019

(51) Int. Cl.
| | |
|---|---|
| *E01C 19/00* | (2006.01) |
| *E01C 23/07* | (2006.01) |
| *G05D 1/02* | (2020.01) |
| *E02F 9/20* | (2006.01) |
| *E02F 9/26* | (2006.01) |
| *E02F 9/24* | (2006.01) |

(52) U.S. Cl.
CPC ............ *E01C 19/004* (2013.01); *E01C 23/07* (2013.01); *E02F 9/2025* (2013.01); *G05D 1/0274* (2013.01); *E02F 9/24* (2013.01); *E02F 9/262* (2013.01)

(58) Field of Classification Search
CPC .......... E01C 19/004; E01C 23/07; E02F 9/24; E02F 9/262; E02F 9/2025; G05D 1/0274

USPC .................................. 404/84.05–84.5, 118
See application file for complete search history.

(56) References Cited

U.S. PATENT DOCUMENTS

| | | | |
|---|---|---|---|
| 5,258,961 | A | 11/1993 | Sehr et al. |
| 5,309,407 | A | 5/1994 | Sehr et al. |
| 7,946,787 | B2 | 5/2011 | Glee et al. |
| 7,946,788 | B2 | 5/2011 | Jurasz et al. |
| 8,382,395 | B2 | 2/2013 | Glee et al. |
| 9,121,145 | B2 | 9/2015 | Berning et al. |
| 10,024,708 | B2 | 7/2018 | Marsolek et al. |
| 2007/0025815 | A1 | 2/2007 | Sick |
| 2009/0317186 | A1 | 12/2009 | Glee et al. |

(Continued)

FOREIGN PATENT DOCUMENTS

| | | |
|---|---|---|
| DE | 102006020293 | 11/2007 |
| DE | 102016006006 | 11/2016 |

(Continued)

*Primary Examiner* — Raymond W Addie
(74) *Attorney, Agent, or Firm* — Lee & Hayes, PLLC

(57) ABSTRACT

A method includes receiving information indicative of a cold planer travel path, the cold planer travel path extending substantially centrally through a cut area formed by a cold planer on a work surface. The method also includes determining a paving machine travel path within the cut area based at least in part on the information, and determining a screed portion setting based at least in part on the paving machine travel path. The method further includes controlling a paving machine to traverse the paving machine travel path, and controlling a screed portion of the paving machine to deposit paving material within the cut area, based at least in part on the screed portion setting, as the paving machine traverses at least a portion of the paving machine travel path.

20 Claims, 4 Drawing Sheets

(56) References Cited

U.S. PATENT DOCUMENTS

2015/0275482 A1\* 10/2015 Hill ................. G01C 15/00
                                                701/50
2017/0167089 A1   6/2017 Marsolek
2017/0191233 A1   7/2017 Barros
2017/0198459 A1   7/2017 Stratton
2017/0233958 A1\* 8/2017 Utterodt ............ E01C 19/48
                                                701/50
2018/0298569 A1\* 10/2018 Engelmann .......... B60R 1/00
2018/0340302 A1\* 11/2018 Menzenbach ...... E01C 19/006
2018/0347145 A1\* 12/2018 Schmidt ............ E02F 3/844

FOREIGN PATENT DOCUMENTS

| EP | 0542297 | 5/1993 |
| EP | 0547378 | 6/1993 |
| EP | 1959056 | 8/2008 |
| WO | 2017100312 | 6/2017 |

\* cited by examiner

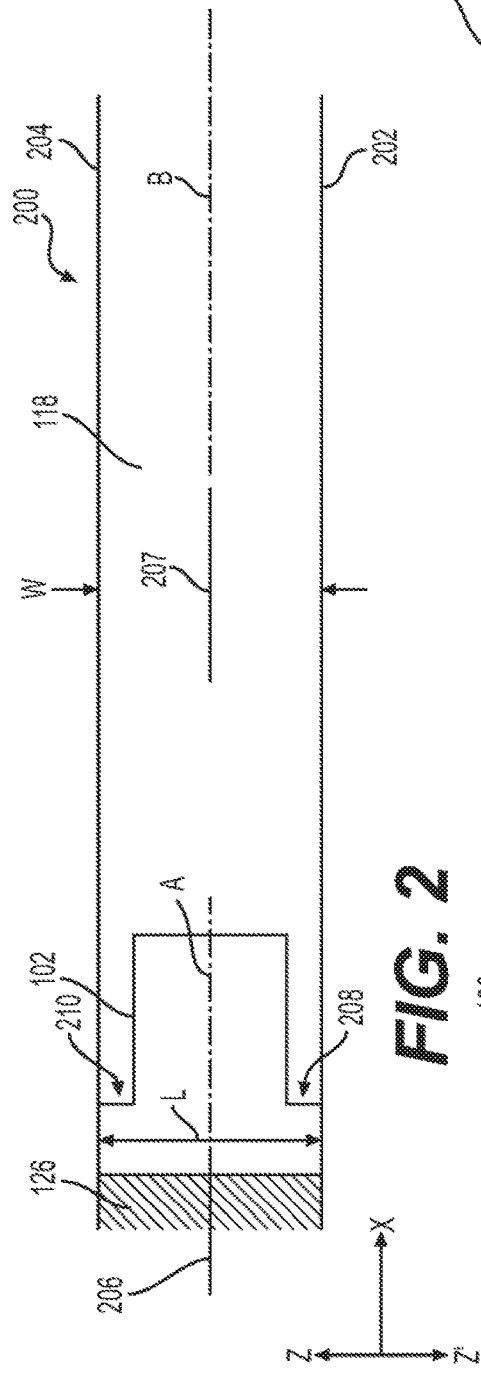
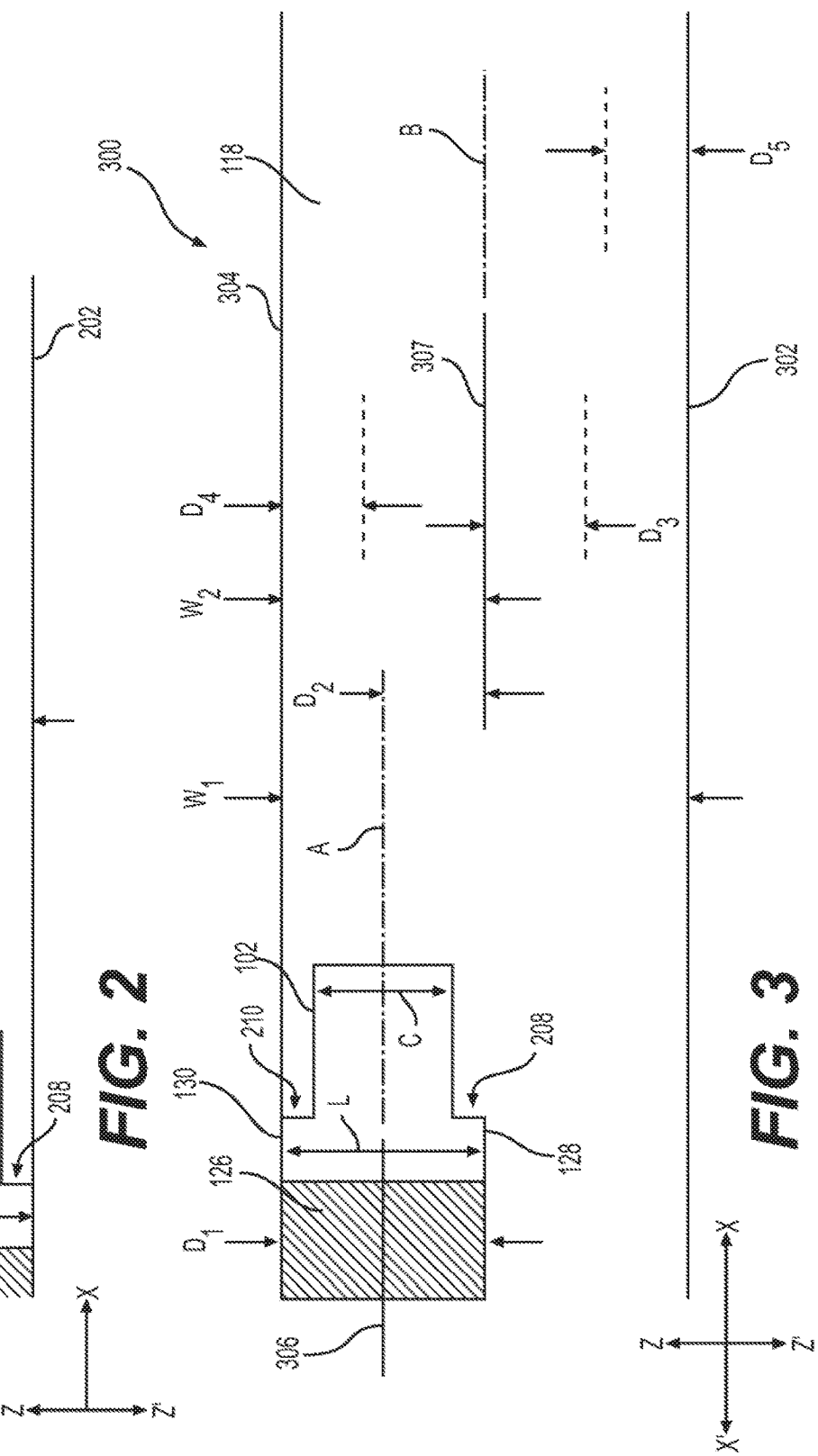

SYSTEM AND METHOD FOR PAVING MACHINE CONTROL

TECHNICAL FIELD

The present disclosure relates to a system for controlling the operation of a paving machine. More specifically, the present disclosure relates to a system configured to control the operation of a paving machine based at least in part on information received from a cold planer or other paving equipment.

BACKGROUND

A paving machine, such as an asphalt paver, is a self-propelled construction machine designed to receive, convey, distribute, profile, and partially compact paving material. Such a paving machine may accept heated paving material (e.g., asphalt) into a receiving hopper at the front of the paving machine. The heated asphalt material in the hopper is conveyed to the rear of the paving machine by conveyors positioned at a base of the hopper. The asphalt material is then distributed across a width of the paving machine by means of two opposing screws or augers. Finally, a screed assembly located at the rear of the paving machine profiles and compacts the asphalt material into a mat on a paving surface. Typically, one or more additional pieces of paving equipment, such as a cold planer, will remove a top layer of a roadway or other such work surface in order to expose the paving surface on which the mat is placed.

An example paving system is described in U.S. Pat. No. 8,382,395 (hereinafter referred to as the '395 patent). In particular, the '395 patent describes a system that includes a paving machine operable to receive information associated with a non-uniform paving surface. The system described in the '395 patent also includes a compactor, and a controller operable to control operation of the compactor based on information associated with a mat of material disposed on the paving surface by the paving machine. The '395 patent does not, however, describe the use of cut area information and/or other information associated with the operation of a cold planer in order to control a travel path of the paving machine, various screed width settings of the paving machine, or other paving machine functions.

Example embodiments of the present disclosure are directed toward improving upon the various paving systems described above.

SUMMARY

In an aspect of the present disclosure, a method includes receiving information indicative of a cold planer travel path, the cold planer travel path extending substantially centrally through a cut area formed by a cold planer on a work surface. The method also includes determining a paving machine travel path within the cut area based at least in part on the information, and determining a screed portion setting based at least in part on the paving machine travel path. The method further includes controlling a paving machine to traverse the paving machine travel path, and controlling a screed portion of the paving machine to deposit paving material within the cut area, based at least in part on the screed portion setting, as the paving machine traverses at least a portion of the paving machine travel path.

In another aspect of the present disclosure, a system includes a cold planer having a location sensor and a communication device, and a paving machine having a screed portion and a controller in communication with the communication device. The controller is configured to receive information from the communication device determined by the location sensor. The information is indicative of a cold planer travel path extending substantially centrally through a cut area formed by the cold planer on a work surface. The controller is also configured to determine a paving machine travel path within the cut area based at least in part on the information, and to determine a screed portion setting based at least in part on the paving machine travel path. The controller is further configured to control the paving machine to traverse the paving machine travel path. Additionally, the controller is configured to control the screed portion to deposit paving material within the cut area, based at least in part on the screed portion setting, as the paving machine traverses at least a portion of the paving machine travel path.

In yet another aspect of the present disclosure, a paving machine includes a hopper adapted to receive paving material, an auger assembly, and a conveyor system adapted to convey the paving material from the hopper to the auger assembly. The auger assembly is adapted to provide the paving material received from the conveyor system to a screed portion of the paving machine, the screed portion including a first end gate and a second end gate opposite the first end gate. The paving machine also includes a communication device configured to determine a location of the paving machine, and a controller in communication with the communication device. The controller is configured to receive information indicative of a cold planer travel path extending substantially centrally through a cut area formed by the cold planer on a work surface, and determine a paving machine travel path within the cut area based at least in part on the information. The controller is also configured to determine a first location of the first end gate based at least in part on the paving machine travel path, determine a second location of the second end gate based at least in part on the paving machine travel path, and control the paving machine to traverse the paving machine travel path. The controller is further configured to control the screed portion to deposit paving material within the cut area, with the first end gate disposed at the first location and the second end gate disposed at the second location, as the paving machine traverses at least a portion of the paving machine travel path.

BRIEF DESCRIPTION OF DRAWINGS

FIG. 2 is a schematic illustration of a paving machine depositing paving material on a paving surface, and along a corresponding travel path, in accordance with an example embodiment of the present disclosure.

FIG. 3 is a schematic illustration of a paving machine depositing paving material on a paving surface, and along a corresponding travel path, in accordance with another example embodiment of the present disclosure.

DETAILED DESCRIPTION

Figure 1:
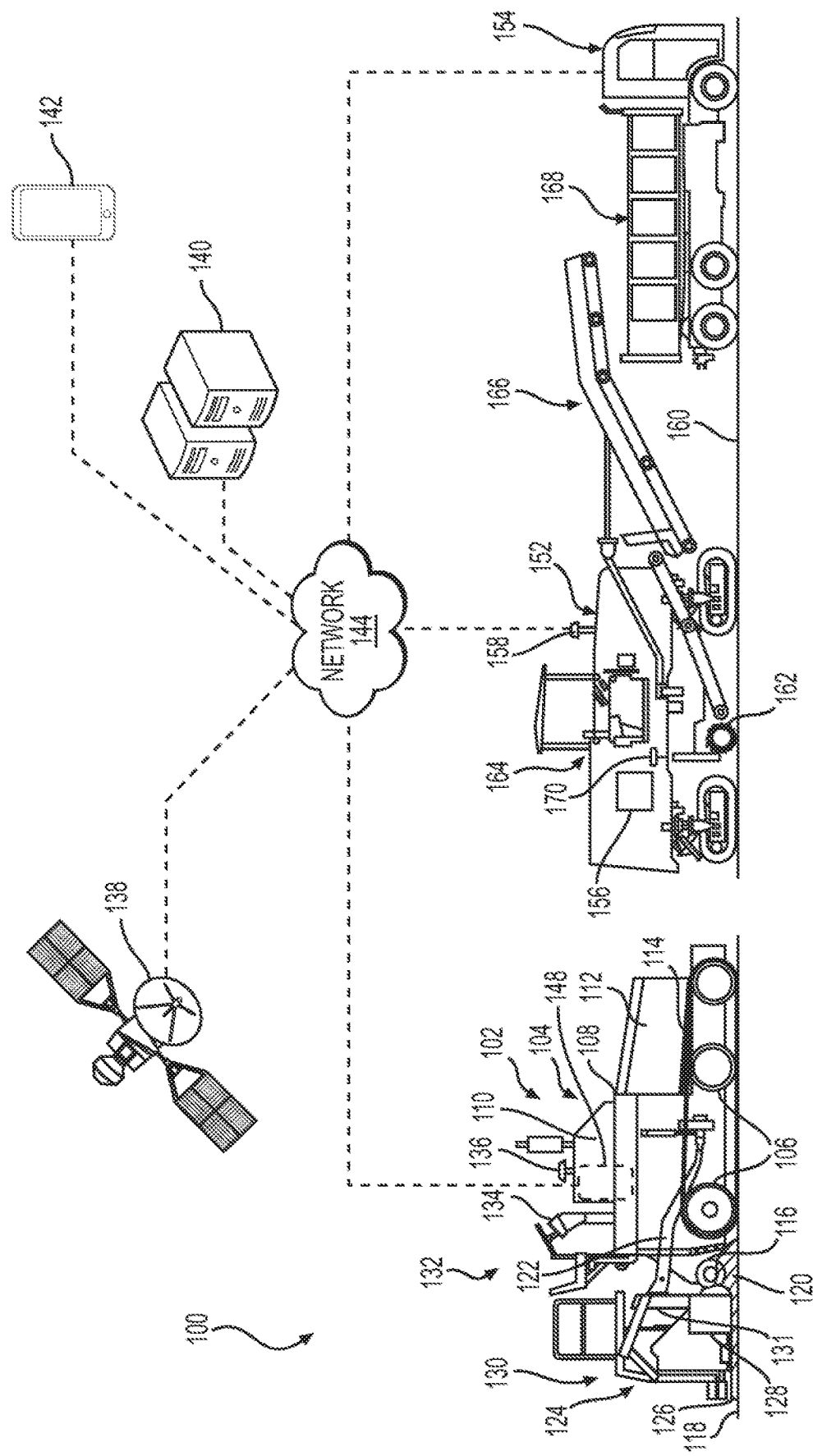
FIG. 1 is a perspective view of a system (e.g., a paving system) in accordance with an example embodiment of the present disclosure. The example system shown in FIG. 1 includes a paving machine and a cold planer.

Wherever possible, the same reference numbers will be used throughout the drawings to refer to the same or like parts. FIG. 1 shows an example system 100 (e.g., a paving system 100) of the present disclosure. The example paving system 100 includes at least one example machine 102 configured for use in one or more excavating, hauling, compacting, paving, or other such processes. The machine 102 is illustrated as a paving machine 102 which may be used, for example, for road or highway constructions, and other allied industries. Alternatively, the machine 102 may be any other machine used for laying asphalt, concrete, or like materials.

The paving machine 102 includes a tractor portion 104 supported on a set of ground-engaging elements 106. The tractor portion 104 includes a tractor frame 108, as well as a power source 110 for driving the ground-engaging elements 106. Although the ground engaging elements 106 are illustrated as wheels, it should be understood that the ground engaging elements 106 may be any other type of ground engaging elements such as, for example, continuous tracks, etc. The power source 110 may be a conventional internal combustion engine operating on fossil or hybrid fuels, or an electrically operated drive powered by alternate energy sources. The paving machine 102 also includes a hopper 112 for storing paving material. The paving machine 102 further includes a conveyor system 114 for conveying the paving material from the hopper 112 to other downstream components of the paving machine 102. For example, the paving machine 102 may include an auger assembly 116 which receives the paving material supplied via the conveyor system 114, and distributes the paving material onto a paving surface 118. Such paving material is illustrated as item 120 in FIG. 1.

In an example embodiment, the auger assembly 116 may include at least one main auger. In some embodiments, the auger assembly 116 may include a main auger, and an auger extension coupled to the main auger via an auger bearing or other coupling component. In further examples, the auger assembly 116 may include a main auger and an additional auger disposed opposite the main auger. In such examples, the main auger and the additional auger may be configured to distribute the paving material 120 across substantially an entire width of the paving machine 102. The paving machine 102 may further include a tow arm 122 which couples a height adjustable screed portion 124 to the tractor portion 104. The tow arm 122 may be actuated by a hydraulic actuator, an electric actuator (not shown), and/or any other type of actuator as per application requirements, and raising or lowering the tow arm 122 may result in commensurate raising or lowering of the screed portion 124.

The screed portion 124 may include one or more augers, rollers, and/or other components configured to assist in spreading and/or compacting the paving material 120 into a mat 126 on the paving surface 118. The screed portion 124 may also include first and second end gates configured to define the width of the mat 126. For example, the screed portion 124 may include a first end gate 128 located on a right-hand side of the paving machine 102 and a second end gate 130 (labeled but obscured from view in FIG. 1) located on a left-hand side of the paving machine 102 opposite the right-hand side. The screed portion 124 may be configured to spread and/or compact the paving material 120 substantially evenly from the first end gate 128 to the second end gate 130 when forming the mat 126. Moreover, the respective positions/locations of the first end gate 128 and the second end gate 130 relative to a frame of the screed portion 124 and/or other portions of the paving machine 102 may be adjusted to define the width of the mat 126. In some examples, the first end gate 128 and/or the second end gate 130 may be independently moveable toward or away from the paving machine 102. In other examples, the first end gate 128 may be moveable in unison with the second end gate 130 toward or away from the paving machine 102. In any of the examples described herein, the paving machine 102 may include one or more electric, hydraulic, pneumatic, electromagnetic, mechanical, and/or other actuators 131 configured to move the first end gate 128 and/or the second end gate 130 relative to the paving machine 102. For example, the paving machine 102 may include a first actuator 131 fixedly connected to a frame of the screed portion 124 and configured to move the first end gate 128 axially inward (e.g., toward) and/or axially outward (e.g., away from) the frame of the screed portion 124 in order to desirably position the first end gate 128. Although not shown in FIG. 1, the paving machine 102 may also include a second such actuator 131 fixedly connected to the frame of the screed portion 124 and configured to move the second end gate 130 axially inward (e.g., toward) and/or axially outward (e.g., away from) the frame of the screed portion 124 in order to desirably position the second end gate 130.

Further referring to FIG. 1, an operator station 132 may be coupled to the tractor portion 104. The operator station 132 may include a console 134 and/or other levers or controls for operating the paving machine 102. For example, the console 134 may include a control interface for controlling various functions of the paving machine 102. The control interface may comprise an analog, digital, and/or touchscreen display, and such a control interface may be configured to display, for example, at least part of a map of the paving surface 118, a travel path associated with the paving machine 102, one or more alerts, requests, or other information provided to an operator of the paving machine 102, boundaries, centerlines, or other information associated with a portion of the paving surface 118 acted on by one or more other machines of the paving system 100, and/or other information. The control interface may also support other functions including, for example, sharing various operating data with one or more other machines of the paving system 100.

As shown, the paving machine 102 may also include a communication device 136. The communication device 136 may be capable of determining a location of the paving machine 102, and may include and/or comprise a component of a global positioning system (GPS). Alternatively, universal total stations (UTS) may be utilized to locate the machine position. For example, the communication device 136 may comprise a GPS receiver, transmitter, transceiver, laser prisms, and/or other such device, and the communication device 136 may be in communication with one or more GPS satellites 138 and/or UTS to determine a location of the paving machine 102 continuously, substantially continuously, or at various time intervals. One or more additional machines of the paving system 100 may also be in communication with the one or more GPS satellites 138 and/or UTS, and such GPS satellites 138 and/or UTS may also be configured to determine respective locations of such additional machines. In an embodiment, the communication device 136 may also enable the paving machine 102 to communicate with the one or more other machines of the paving system 100, with one or more servers, processors, controllers, computing devices, or control systems 140 located remote from the worksite at which the paving machine 102 is being used, with one or more tablets, computers, cellular/wireless telephones, personal digital assistants, mobile devices, or other electronic devices 142 located at the worksite and/or remote from the worksite, and/or with other devices or machines.

In any of the examples described herein, the communication device 136 may be connected to and/or otherwise in communication with such other machines, control systems 140, and/or electronic devices 142 via a network 144. The network 144 may be a local area network ("LAN"), a larger network such as a wide area network ("WAN"), or a collection of networks, such as the Internet. Protocols for network communication, such as TCP/IP, may be used to implement the network 144. Although embodiments are described herein as using a network such as the Internet, other distribution techniques may be implemented that transmit information via memory cards, flash memory, or other portable memory devices.

The paving machine 102 may also include a controller 148 operably connected to and/or otherwise in communication with the screed portion 124, the first and second end gates 128, 130, the console 134, the communication device 136, and/or other components of the paving machine 102. The controller 148 may be a single controller or multiple controllers working together to perform a variety of tasks. The controller 148 may embody a single or multiple microprocessors, field programmable gate arrays (FPGAs), digital signal processors (DSPs), and/or other components configured to calculate and/or otherwise determine one or more travel paths of the paving machine 102, screed settings, and/or other operational constraints of the paving machine 102 based at least in part on information received from the one or more other machines of the paving system 100, paving machine operating information received from an operator of the paving machine 102, one or more signals received from the GPS satellites 138, and/or other information. Numerous commercially available microprocessors can be configured to perform the functions of the controller 148. Various known circuits may be associated with the controller 148, including power supply circuitry, signal-conditioning circuitry, actuator driver circuitry (i.e., circuitry powering solenoids, motors, or piezo actuators), and communication circuitry. In some embodiments, the controller 148 may be positioned on the paving machine 102, while in other embodiments the controller 148 may be positioned at an off-board location and/or remote location relative to the paving machine 102. The present disclosure, in any manner, is not restricted to the type of controller 148 or the positioning of the controller 148 relative to the paving machine 102. In any of the examples described herein, the location information, boundary information, travel paths, operating information, screed settings, and/or any other information determined, processed, or generated by the controller 148 may be provided to the one or more additional machines, control systems 140, and/or electronic devices 142 via the network 144. Similarly, any of the information received by the controller 148 may be received via the network 114 and/or the communication device 136.

As will be described in greater detail below, in some embodiments the controller 148 may receive various information from one or more other machines of the paving system 100, and may control the operation of paving machine 102 based at least in part on such information. For example, the paving system 100 may further include one or more cold planers 152 and/or one or more haul trucks 154. In such examples, a cold planer 152 may include a controller 156 that is substantially similar to and/or the same as the controller 148 described above with respect to the paving machine 102. In such examples, the controller 156 of the cold planer 152 may be in communication with the controller 148 of the paving machine 102 via the network 144. For example, the cold planer 152 may include a communication device 158 configured to send information to the communication device 136 of the paving machine 102 and/or receive information from the communication device 136 of the paving machine 102 via the network 144.

The cold planer 152 may further include one or more rotors having ground-engaging teeth, bits, or other components configured to remove at least a portion of the roadway, pavement, asphalt, concrete, gravel, dirt, sand, or other materials of a work surface 160 on which the cold planer 152 is disposed. For example, in any of the examples described herein, the cold planer 152 may include a single rotor 162 that may be lowered into contact with the work surface 160 by the cold planer 152. In such examples, the rotor 162 of the cold planer 152 may be rotated in a clockwise and/or counterclockwise direction relative to a frame of the cold planer 152 as respective ground-engaging teeth, bits, or other components of the rotor 162 contact the work surface 160 to remove a portion thereof and to reveal the paving surface 118. Alternatively, in some examples the rotor 162 may comprise a first rotor 162 of the cold planer 152. In such examples, first rotor 162 may be located on a right-hand side of the cold planer 152, and the cold planer 152 may also include a second rotor 164 (labeled but obscured from view in FIG. 1) located on a left-hand side of the cold planer 152 opposite the right-hand side. In such example embodiments the first and second rotors 162, 164 may be lowered into contact with the work surface 160 by the cold planer 152, and may be rotated in a clockwise and/or counterclockwise direction relative to a frame of the cold planer 152 as respective ground-engaging teeth, bits, or other components of the first and second rotors 162, 164 are in contact with the work surface 160. As a result of such rotation, in combination with force applied to the work surface 160 by the one or more rotors of the cold planer 152 in a substantially downward direction (e.g., away from the frame of the cold planer 152 and substantially vertically toward the work surface 160), portions of the work surface 160 may be removed by the cold planer 152 to reveal the paving surface 118. The cold planer 152 may also include a conveyor system 166 configured to transport removed portions of the work surface 160 from proximate the rotor 162 (or from proximate the first and second rotors 162, 164) to a bed 168 of the haul truck 154.

As shown in FIG. 1, the cold planer 152 may further include one or more GPS sensors or other like location sensors 170 configured to determine a location of the cold planer 152 and/or components thereof. In example embodiments, a location sensor 170 connected to the frame of the cold planer 152 may be configured to determine GPS coordinates (e.g., latitude and longitude coordinates), grid coordinates, a map location, and/or other information indicative of the location of the cold planer 152, in conjunction with the one or more GPS satellites 138 described above. In such examples, the controller 156 of the cold planer 152 and/or the controller 148 of the paving machine 102 may determine corresponding GPS coordinates of the axially outermost edges (e.g., a left edge and a right edge) of the rotor 162 based at least in part on the information (e.g., GPS coordinates) indicative of the location of the cold planer 152. In examples in which the cold planer 152 includes first and second rotors 162, 164, the controller 156 of the cold planer 152 and/or the controller 148 of the paving machine 102 may determine GPS coordinates of the axially outermost edge of the first rotor 162, and of the axially outermost edge of the second rotor 164, based at least in part on the information (e.g., GPS coordinates) indicative of the location of the cold planer 152. Any of the processes described above (e.g., processes associated with cold planers 152 having a single rotor 162, or having first and second rotors 162, 164) may be repeated by the controller 156 of the cold planer 152 and/or the controller 148 of the paving machine 102 for each new/updated set of GPS coordinates or other information indicative of the current location of the cold planer 152 as the cold planer 152 traverses a travel path on the work surface 160.

Alternatively, the cold planer 152 may include one or more location sensors 170 positioned proximate the respective axially outermost edges (e.g., the left edge and the right edge) of the rotor 162 and/or calibrated or otherwise configured to directly determine the GPS coordinates of the axially outermost edges of the rotor 162. In such examples, the location sensors 170 may continuously, substantially continuously, and/or otherwise determine the respective GPS coordinates of the axially outermost edges of the rotor 162 as the cold planer 152 traverses a travel path on the work surface 160.

Collectively, the determined GPS coordinates of the axially outermost edges of the rotor 162 may form respective outer boundaries (e.g., left and right hand boundaries) of an area of the work surface 160 removed by the cold planer 152 (e.g., a cut area). As will be described in greater detail below, the controller 148 of the paving machine 102 may use such information to determine a travel path of the paving machine 102 along the paving surface 118, to determine one or more screed portion settings, and/or to otherwise assist in controlling the operation of the paving machine 102. For example, in some situations the cold planer 152 may form a cut area having a substantially uniform depth and a substantially uniform width. The depth of the cut area may be measured and/or may otherwise extend substantially vertically downward from a top surface of the work surface 160. The width of the cut area, as will be illustrated in FIGS. 2-4, may be measured and/or may otherwise extend substantially horizontally across the work surface, and may extend substantially perpendicularly from the outer boundaries of the work surface 160. In such examples, the controller 148 may determine a travel path of the paving machine 102 that enables the paving machine 102 to travel along or substantially parallel to a centerline of the cut area, while the first end gate 128 overlays a first edge or boundary of the cut area and the second end gate 130 overlays a second edge or boundary of the cut area opposite the first boundary.

Alternatively, in further examples the cold planer 152 may form a cut area that has two or more different depths and/or widths along a length of the cut area. In a first such example, the cold planer 152 may form a cut area having a first portion associated with a road surface to be paved that includes a first depth and corresponding first width. The cut area may also include at least one second portion adjacent to the first portion. Such a second portion may be associated with a shoulder of the road surface, and the second portion may include a second depth and corresponding second width. In such examples, the first width may be greater than the second width along a length of the cut area. Additionally, the first depth may be greater than the second depth along a length of the cut area. In such examples, the controller 148 may determine a travel path of the paving machine 102 that enables the paving machine 102 to travel along or substantially parallel to a centerline of the cut area, while the first end gate 128 overlays either an outer edge of the second portion of the cut area (e.g., an outer edge of the portion of the cut area associated with the shoulder). Alternatively, in such examples, the first end gate 128 may be controlled to overlay the outer edge of the first portion of the cut area (e.g., the outer edge of the portion of the cut area associated with the road surface). Such an outer edge may be located at the intersection of/transition between the first portion of the cut area described above and the second portion of the cut area.

In still further examples, the cold planer 152 may form a cut area having a first portion associated with a road surface to be paved that includes a first depth and corresponding first width. The cut area may also include at least one second portion adjacent to the first portion. Such a second portion may comprise a portion that has not yet been milled to an appropriate or required depth in accordance with a jobsite plan. For example, such a second portion may include a second depth and corresponding second width. In such examples, the first width may be greater than the second width along a length of the cut area. Additionally, the first depth may be greater than the second depth along a length of the cut area. In such examples, the controller 148 may determine a travel path of the paving machine 102 that enables the paving machine 102 to travel along or substantially parallel to a centerline of the cut area, while the first end gate 128 overlays either an outer edge of the second portion of the cut area or an outer edge of the first portion of the cut area. In such examples, the outer edge of the first portion of the cut area may be located at the intersection of/transition between the first portion of the cut area and the second portion of the cut area.

In any of the examples described herein, the controller 148 of the paving machine 102 may determine one or more such travel paths and/or screed portion settings through extrapolation, using one or more trigonometric algorithms, using one or more neural networks and/or machine learning algorithms, using fuzzy logic, using one or more look-up tables, and/or through one or more additional methods. In an exemplary embodiment, the controller 148 may have an associated memory in which various extrapolation models, trigonometric algorithms, machine learning algorithms, look-up tables, and/or other components may be stored for determining one or more travel paths and/or screed portion settings based on one or more inputs. Such inputs may include, for example, the determined GPS coordinates of the axially outermost edges of the rotor 162. The controller 148 may also use information received from one or more additional sensors, the control system 140, the one or more electronic devices 142, an operator of the paving machine 102 via the console 134, and/or from any other information sources described herein. Further, in example embodiments of the present disclosure in which the paver 152 includes a first rotor 162 and a second rotor 164, the cold planer 152 may include one or more location sensors 170 positioned proximate the axially outermost edge of the first rotor 162, and one or more additional location sensors 170 positioned proximate the axially outermost edge of the second rotor 164. In such examples, the location sensors 170 may determine GPS coordinates of the axially outermost edges of the first and second rotors 162, 164, and the controller 148 may use such information to determine a travel path of the paving machine 102 along the paving surface 118, to determine one or more screed portion settings, and/or to otherwise assist in controlling the operation of the paving machine 102.

Figure 4:
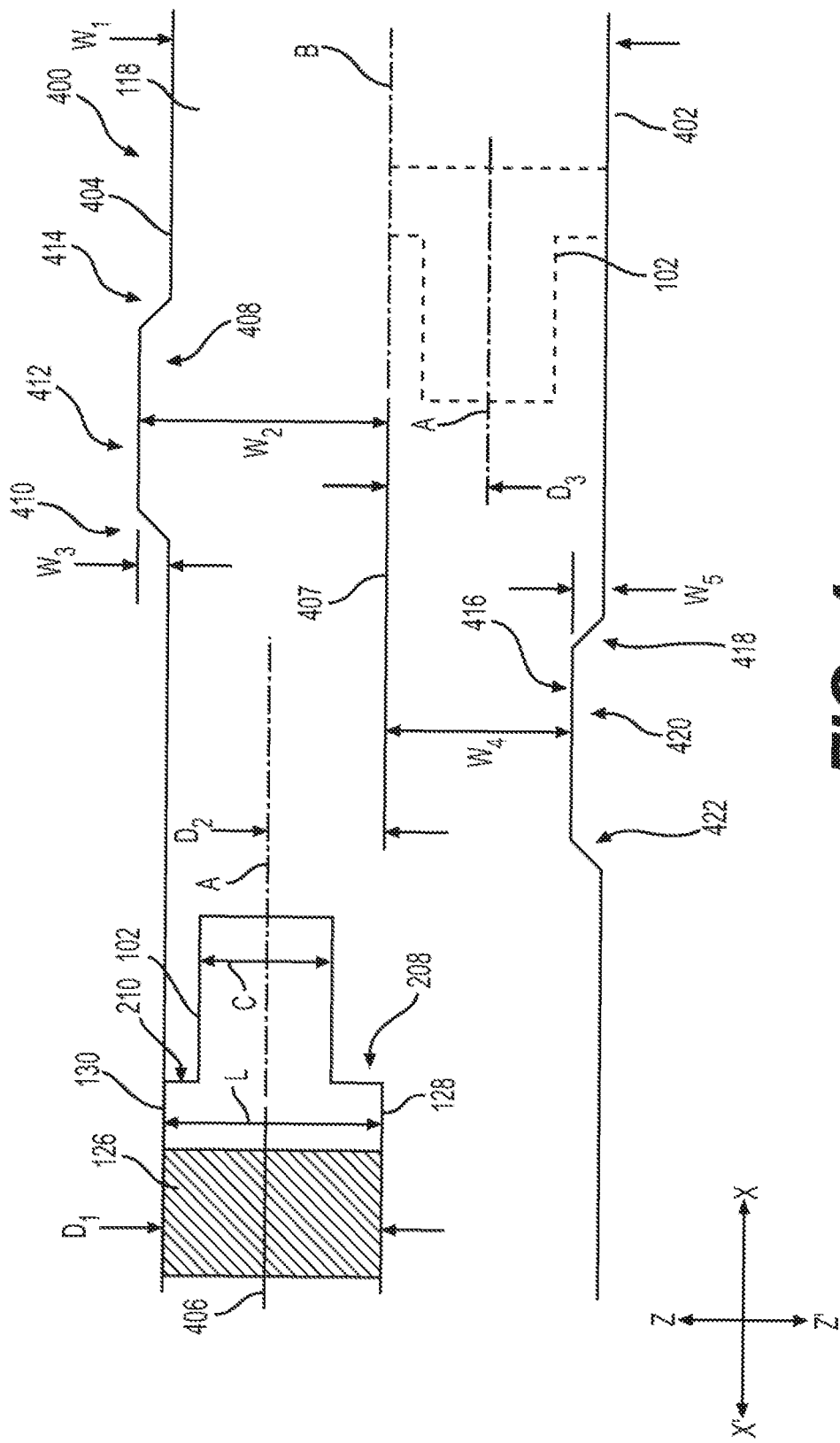
FIG. 4 is a schematic illustration of a paving machine depositing paving material on a paving surface, and along a corresponding travel path, in accordance with still another example embodiment of the present disclosure.

FIGS. 2-4 provide schematic illustrations of example paving machines 102 being controlled to operate based at least in part on respective paving machine travel paths, one or more screed portion settings, and/or other control parameters determined by the controller 148 and/or other components of the paving system 100 described above. It is understood that any of the operations described with respect to FIGS. 2-4 may be performed by the paving machine 102 in an autonomous operation mode and/or in semi-autonomous operating mode. In an example autonomous operating mode, the controller 148 of the paving machine 102, the control system 140, the one or more electronic devices 142, and/or other components of the paving system 100 in communication with the paving machine 102 may control one or more operations of the paving machine 102 automatically and/or without input from an operator of the paving machine 102. In such examples, the paving machine 102 may comprise an autonomous paving machine of the paving system 100. In an example semi-autonomous operating mode, on the other hand, the controller 148 of the paving machine 102, the control system 140, the one or more electronic devices 142, and/or other components of the paving system 100 in communication with the paving machine 102 may control one or more operations of the paving machine 102 based at least in part on one or more inputs from an operator of the paving machine 102.

FIG. 2 illustrates an example cut area 200 of the present disclosure. The cut area 200 may be formed by a cold planer 152 (FIG. 1) on the work surface 160 (FIG. 1) to reveal the paving surface 118, and the paving machine 102 may be operated to deposit paving material 120 (e.g., a mat 126) on the paving surface 118 and within the cut area 200. As shown in FIG. 2, an example cut area 200 formed by the cold planer 152 may include a first boundary 202 (e.g., a right-hand side boundary) and a second boundary 204 (e.g., a left-hand side boundary) disposed opposite and substantially parallel to the first boundary 202. The cut area 200 may have a width W and a centerline B extending substantially centrally (e.g., longitudinally) through the cut area 200 along the paving surface 118. In some examples, the centerline B of the cut area 200 may extend substantially centrally between the first boundary 202 and the second boundary 204. In such examples, a travel path 207 of the cold planer 152 associated with the cut area 200 may extend substantially collinear with the centerline B of the cut area 200. In other examples, the travel path 207 of the cold planer 152 may diverge, at least in part, from the centerline B of the cut area 200. In any of the examples described herein, the travel path 207 of the cold planer 152 may comprise a line, travel envelope, and/or other path traversed by the cold planer 152 along the work surface 160 when forming the cut area 200. In such examples, the cut area 200 may have a substantially vertical depth between approximately 2 inches and approximately 4 inches. In further examples, the depth of the cut area 200 may be greater than approximately 4 inches or less than approximately 2 inches depending on the requirements of the paving operation being performed on the work surface 160. It is understood that any of the depths, dimensions, or other configurations of the cut area 200 described herein are merely examples, and such configurations should not be interpreted as limiting the present disclosure in any way.

In some examples, the width W of the cut area 200 may be substantially equal to a maximum cutting span of the cold planer 152. In additional examples, on the other hand, an example cut area of the present disclosure may include one or more widths, shapes, features, contours, and/or other configurations formed by cold planer 152 as the cold planer 152 is controlled to traverse the work surface 160 in more than one pass and/or according to one or more additional (e.g., non-linear) travel paths. As noted above, in some examples, the cold planer 152 may include a single rotor 162, and in such examples, the width W of the cut area 200 may be substantially equal to the axial (e.g., longitudinal) distance between the first end of the rotor 162 and the second end of the rotor 162. Alternatively, in some examples the width W of the cut area 200 may be substantially equal to the axial (e.g., longitudinal) distance between a first end of a first rotor 162 (FIG. 1), and a second end of a second rotor 164 (FIG. 1) opposite the first end of the first rotor 162.

In example embodiments, the controller 148 of the paving machine 102 may receive one or more signals from the cold planer 152 (e.g., from the communication device 158 of the cold planer 152 and via the network 144) including information indicative of the travel path 207. For example, one or more of the location sensors 170 associated with the cold planer 152 may measure, detect, sense, calculate, and/or otherwise determine GPS coordinates indicative of the location of the cold planer 152 as the cold planer 152 traverses the travel path 207. In such examples, a location sensor 170 disposed on the cold planer 152 may determine a plurality of sequential GPS coordinates indicative of the location of the cold planer 152 continuously, substantially continuously, and/or at regular or irregular intervals. In such examples, the controller 156 of the cold planer 152 may control the communication device 158 to send one or more signals including such information to the controller 148, via the network 144, and the controller 148 may determine a location of the first boundary 202, a location of the second boundary 204, a location of the centerline B, a location of the travel path 207, and/or any other information indicative of a shape, size, depth, extent, and/or other configuration of the cut area 200 based at least in part on such information. For example, the controller 148 may calculate the location and/or extent of the first boundary 202 based on the plurality of sequential GPS coordinates indicative of the location of the cold planer 152 as it traveled along the travel path 207, information indicating the particular location of the location sensor 170 on the frame or other portion of the cold planer 152, any known offsets or other calibration parameters corresponding to the particular location sensor 170, and length, width, diameter, position, and/or other dimensions of the rotor 162 (or of the first and second rotors 162, 164) used to form the cut area 200. In particular, the controller 148 may calculate a series of sequential GPS coordinates that, collectively, indicate the location and/or extent (e.g., length and/or direction) of the first boundary 202. In such examples, the controller 148 may employ one or more similar calculations or processes to determine the location and/or extent of the second boundary 204, the centerline B, the travel path 207, and/or other items. Alternatively, it is understood that the controller 156 of the cold planer 152 may perform such operations.

In further examples, a first location sensor 170 associated with the cold planer 152 may determine a first plurality of sequential GPS coordinates indicative of the location of a first axially outermost edge (e.g., a right edge) of the rotor 162 of the cold planer 152 as the cold planer 152 traverses the travel path 207. A second location sensor 170 associated with the cold planer 152 may also determine a second plurality of sequential GPS coordinates indicative of the location of a second axially outermost edge (e.g., a left edge) of the rotor 162 as the cold planer 152 traverses the travel path 207. In such an example, the first and second location sensors 170 may make such measurements and/or other determinations continuously, substantially continuously, and/or at regular or irregular intervals. In such examples, the controller 156 of the cold planer 152 may control the communication device 158 to send one or more signals including such information to the controller 148, via the network 144, and the controller 148 may determine a location of the first boundary 202, a location of the second boundary 204, a location of the centerline B, a location of the travel path 207, and/or any other information indicative of a shape, size, depth, extent, and/or other configuration of the cut area 200 based at least in part on such information. For example, the controller 148 may calculate the location and/or extent of the first boundary 202 based on the first and second pluralities of GPS coordinates, information indicating the respective locations of the first and second location sensors 170 on the frame or other portion of the cold planer 152, any known offsets or other calibration parameters corresponding to the first and second location sensors 170, and length, width, diameter, position, and/or other dimensions of the first and second rotors 162, 164 used to form the cut area 200. In particular, the controller 148 may calculate a series of sequential GPS coordinates that, collectively, indicate the location and/or extent (e.g., length and/or direction) of the first boundary 202. In such examples, the controller 148 may employ one or more similar calculations or processes to determine the location and/or extent of the second boundary 204, the centerline B, the travel path 207, and/or other items. Alternatively, it is understood that the controller 156 of the cold planer 152 may perform such operations. In examples in which the cold planer 152 includes first and second rotors 162, 164, the process described above may be performed using one or more location sensors 170 disposed proximate the axially outermost edge of the first rotor 162, and one or more additional location sensors 170 disposed proximate the axially outermost edge of the second rotor 164.

With continued reference to FIG. 2, the GPS coordinates indicative of the location of the cold planer 152 as the cold planer 152 traverses the travel path 207, the first plurality of sequential GPS coordinates indicative of the location of the first axially outermost edge of the rotor 162, the second plurality of sequential GPS coordinates indicative of the location of the second axially outermost edge of the rotor 162, the cut depth (substantially constant and/or variable) of the cut area 200, and/or other information received from the controller 156 and/or other components of the cold planer 152 may comprise information indicative of the travel path 207 and/or indicative of the centerline B of the cut area. In particular, as noted above, such information may be indicative of the location and/or extent of the first boundary 202, and of the location and/or extent of the second boundary 204. In any of the examples described herein, the controller 148 of the paving machine 102 may determine a travel path 206 of the paving machine 102 based at least in part on such information. As shown in FIG. 2, an example travel path 206 of the paving machine 102 may extend substantially collinear with a corresponding centerline A of the paving machine 102. In any of the examples described herein, the travel path 206 of the paving machine 102 may comprise a line, travel envelope, and/or other path within the cut area 200 that the paving machine 102 may be controlled to traverse while depositing paving material 120 within the cut area 200 and/or while otherwise forming the mat 126 within the cut area 200.

In the example embodiment of FIG. 2, the controller 148 may determine one or more operating parameters of the paving machine 102 based at least in part on the information received from the cold planer 152, and such operating parameters may be used by the controller 148 to control the steering, speed, amount of paving material 120 deposited on the work surface 160, braking, and/or various operations of the paving machine 102. For example, the controller 148 may generate and/or otherwise determine the travel path 206 of the paving machine 102 based at least in part on the GPS coordinates indicative of the location of the cold planer 152 as the cold planer 152 traverses the travel path 207, the first plurality of sequential GPS coordinates indicative of the location of the first axially outermost edge of the rotor 162, the second plurality of sequential GPS coordinates indicative of the location of the second axially outermost edge of the rotor 162, the cut depth of the cut area 200, and/or other information received from the controller 156 and/or other components of the cold planer 152. In particular, the controller 148 may determine the location and/or extent of the first and second boundaries 202, 204 based on the various calculations and/or other processes noted above.

As illustrated by the example embodiment of FIG. 2, in some examples the controller 148 may also determine that a maximum width W of the cut area 200 extending from the first boundary 202 to the second boundary 204 is less than or equal to a maximum distance L between the first end gate 128 of the screed portion 124 (FIG. 1) and the second end gate 130 (FIG. 1) of the screed portion 124 opposite the first end gate 128. In such examples, it is understood that the controller 148 may also determine that the maximum width W of the cut area 200 is greater than or equal to a minimum distance between the first end gate 128 of the screed portion 124 (FIG. 1) and the second end gate 130. Further, in such examples, the paving machine 102 may be capable of forming a mat 126 extending from the first boundary 202 to the second boundary 204, in a single pass within the cut area 200, by spacing the first and second end gates 128, 130 by the maximum distance L. Accordingly, in such examples, the controller 148 may generate and/or otherwise determine a travel path 206 governing travel of the paving machine 102 within the cut area 200 that extends substantially collinear with the travel path 207 of the cold planer 152. In such examples, the travel path 206 of the paving machine 102 may also extend substantially collinear with the centerline B of the cut area 200. Further, in such examples controlling the paving machine 102 (e.g., steering the paving machine 102) such that the centerline A of the paving machine 102 extends substantially collinear with the travel path 206 as the paving machine 102 traverses the travel path 206 may result in a first end 208 of the screed portion 124 (e.g., the first end gate 128) passing along, passing over, and/or being disposed substantially aligned with the first boundary 202 of the cut area 200 as the paving machine 102 traverses the travel path 206. In such examples, and as illustrated in FIG. 2, controlling the paving machine 102 (e.g., steering the paving machine 102) such that the centerline A of the paving machine 102 extends substantially collinear with the travel path 206 as the paving machine 102 traverses the travel path 206 may also result in a second end 210 of the screed portion 124 (e.g., the second end gate 130) passing along, passing over, and/or being disposed substantially aligned with the second boundary 204 of the cut area 200 as the paving machine 102 traverses the travel path 206. Additionally or alternatively, in such examples an operator of the paving machine 102 may choose to align the first end 208 of the screed portion 124 with the first boundary 202 as the paving machine 102 traverses the travel path 206, and/or may choose to align the second end 210 of the screed portion 124 with the second boundary 204 as the paving machine 102 traverses the travel path 206.

FIG. 3 illustrates an example cut area 300 of the present disclosure. Similar to the cut area 200 illustrated in FIG. 2, the cut area 300 may be formed by a cold planer 152 (FIG. 1) on the work surface 160 (FIG. 1) to reveal the paving surface 118, and the paving machine 102 may be operated to deposit paving material 120 (e.g., a mat 126) on the paving surface 118 and within the cut area 300. As shown in FIG. 3, the example cut area 300 may include a first boundary 302 (e.g., a right-hand side boundary) and a second boundary 304 (e.g., a left-hand side boundary) disposed opposite and substantially parallel to the first boundary 302.

Similar to the cut area 200 described above with respect to FIG. 2, the cut area 300 illustrated in FIG. 3 is substantially uniform in shape (e.g., substantially rectangular). For example, substantially the entire length of the cut area 300 may include a substantially uniform width $W_1$. The cut area 300 may also include a centerline B extending substantially centrally (e.g., longitudinally) through substantially the entire cut area 300 along the paving surface 118. Accordingly, the centerline B of the cut area 300 may extend substantially centrally between the first boundary 302 and the second boundary 304.

As shown in FIG. 3, in some examples, a travel path 307 of the cold planer 152 associated with the cut area 300 may extend substantially collinear with the centerline B of the cut area 300 for substantially the entire length of the cut area 300. In further examples, a travel path of the cold planer 152 may diverge, at least in part, from the centerline B of the cut area. Such divergence of the travel path from the centerline B of the cut area may be illustrative of the need for the cold planer 152 to traverse various portions of the cut area 300, pivot, turn, veer left or right, and/or otherwise maneuver within the cut area 300 in order to form various features of an example cut area 300. In still further examples (e.g., examples in which two or more substantially parallel passes of the cold planer 152 are required to form a relatively wide cut area), multiple travel paths of the cold planer 152 may be offset from (e.g., may extend substantially parallel to) the centerline B of the cut area 300. In such examples, the width $W_1$ of the cut area 300 may be wider than the cutting width of the cold planer 152.

In example embodiments, the controller 148 of the paving machine 102 may receive one or more signals from the cold planer 152 (e.g., from the communication device 158 of the cold planer 152 and via the network 144) including information indicative of the travel path 307. For instance, one or more of the location sensors 170 associated with the cold planer 152 may measure, detect, sense, calculate, and/or otherwise determine GPS coordinates indicative of the location of the cold planer 152 as the cold planer 152 traverses the travel path 307. In such examples, the controller 156 of the cold planer 152 may control the communication device 158 to send one or more signals including such information to the controller 148, via the network 144, and the controller 148 may determine a location of the first boundary 302, a location of the second boundary 304, a location of the centerline B, a location of the travel path 307, and/or any other information indicative of a shape, size, depth, extent, and/or other configuration of the cut area 300 based at least in part on such information.

In further examples, a first location sensor 170 associated with the cold planer 152 may determine a first plurality of sequential GPS coordinates indicative of the location of the first axially outermost edge of the rotor 162 of the cold planer 152 as the cold planer 152 traverses the travel path 307. A second location sensor 170 associated with the cold planer 152 may also determine a second plurality of sequential GPS coordinates indicative of the location of the second axially outermost edge of the rotor 162 as the cold planer 152 traverses the travel path 307. In such examples, the controller 156 of the cold planer 152 may control the communication device 158 to send one or more signals including such information to the controller 148, via the network 144, and the controller 148 may determine a location of the first boundary 302, a location of the second boundary 304, a location of the centerline B, a location of the travel path 307, and/or any other information indicative of a shape, size, depth, extent, and/or other configuration of the cut area 300 based at least in part on such information. As noted above, in examples in which the cold planer 152 includes first and second rotors, 162, 164, a similar process may be performed by the first and second locations sensors 170 and/or the controller 156 based on a first plurality of sequential GPS coordinates indicative of the locations of the axially outermost edges of the first and second rotors 162, 164.

With continued reference to FIG. 3, the information received from the controller 156 and/or other components of the cold planer 152 may comprise information indicative of the travel path 307 and/or indicative of the centerline B of the cut area. In particular, such information may be indicative of the location and/or extent of the first boundary 302, and of the location and/or extent of the second boundary 304. In any of the examples described herein, the controller 148 of the paving machine 102 may determine a travel path 306 of the paving machine 102 based at least in part on such information. Further, as illustrated in FIG. 3, in some examples the controller 148 may also determine that the width $W_1$ (e.g., a maximum width) of the cut area 300, extending from the first boundary 302 to the second boundary 304 is greater than a maximum distance L between the first end gate 128 of the screed portion 124 (FIG. 1) and the second end gate 130 (FIG. 1) of the screed portion 124 opposite the first end gate 128. In such examples, the paving machine 102 may not be capable of forming a mat 126, extending from the first boundary 302 to the second boundary 304, in a single pass within the cut area 300. Accordingly, in such examples, the controller 148 may generate and/or otherwise determine one or more travel paths 306 governing travel of the paving machine 102 within the cut area 300 that extend substantially parallel to the centerline B of the cut area 300, and one or more such travel paths 306 may be offset and/or otherwise spaced from the centerline B. In the example embodiment of FIG. 3, a first travel path 306 may be spaced from the centerline B by a distance $D_2$, and a second travel path (not shown) may be spaced from the centerline B by a distance $D_3$ that is approximately equal to the distance $D_2$. In some examples, a width $W_2$, approximately half of the width $W_1$, may define the position of the centerline B throughout the cut area 300. In such examples, the distance $D_2$ may be approximately equal to half of the width $W_2$. Further, in such examples, the controller 148 may cause the paving machine 102 to traverse the first travel path 306 as the paving machine 102 makes a first pass through the cut area 300 in the direction X, and my cause the paving machine 102 to traverse the second travel path (not shown) as the paving machine 102 makes a second pass through the cut area 300 in the direction X' opposite the direction X.

Further, in such examples the controller 148 may control the first end gate 128 and the second end gate 130 to be positioned at respective locations relative to the frame of the screed portion 124 as the paving machine 102 traverses the travel path 306 in the direction X. Configuring the first end gate 128 and the second end gate 130 in this way may enable the paving machine 102 to form a mat 126 having a width $D_1$ approximately equal to the width $W_2$ at all points along the travel path 306, and the mat 126 having the width $W_1$ may cover substantially half of the cut area 300 (e.g., approximately half of the width $W_1$). In such examples, as the paving machine 102 traverses the travel path 306 in the direction X the controller 148 may cause, for example, the second end 210 of the screed portion 124 (e.g., the second end gate 130) to pass along, pass over, and/or be otherwise disposed substantially aligned with the second boundary 304 of the cut area 300 as the paving machine 102 traverses the travel path 306. As the paving machine 102 traverses the travel path 306 in the direction X the controller 148 may also cause the first end 208 of the screed portion 124 (e.g., the first end gate 128) to pass along, pass over, and/or be otherwise disposed substantially aligned with the centerline B. Further, in such examples as the paving machine 102 traverses the second travel path noted above in the direction X' opposite the direction X, the controller 148 may cause, for example, the second end 210 of the screed portion 124 (e.g., the second end gate 130) to pass along, pass over, and/or be otherwise disposed substantially aligned with the first boundary 302 of the cut area 300. As the paving machine 102 traverses the travel path 306 in the direction X' the controller 148 may also cause the first end 208 of the screed portion 124 (e.g., the first end gate 128) to pass along, pass over, and/or be otherwise disposed substantially aligned with the centerline B.

It is understood that in some embodiments in which, as in FIG. 3, the controller 148 determines that the width $W_1$ (e.g., a maximum width) of the cut area 300 is greater than the distance L (e.g., a maximum distance) between the first end gate 128 of the screed portion 124 and the second end gate 130, an operator of the paving machine 102 and/or the controller 148 may control the paving machine 102 to operate in accordance with one or more alternative alignment and/or offset strategies associated with the various travel paths 306 corresponding to the cut area 300. For instance, as noted above, the controller 148 may generate and/or otherwise determine one or more travel paths 306 governing travel of the paving machine 102 within the cut area 300 that extend substantially parallel to the centerline B of the cut area 300. In some examples, and as shown schematically by FIG. 3, a first travel path 306 may be spaced from the second boundary 304 by a distance $D_4$, and a second travel path (not shown) may be spaced from the first boundary 302 by a distance $D_5$ that is approximately equal to the distance $D_4$. In such examples, the controller 148 may cause the paving machine 102 to traverse the first travel path 306 (spaced from the second boundary 304 by the distance $D_4$) as the paving machine 102 makes a first pass through the cut area 300 in the direction X, and may cause the paving machine 102 to traverse the second travel path (spaced from the first boundary 302 by a distance $D_5$) as the paving machine 102 makes a second pass through the cut area 300 in the direction X' opposite the direction X. In such examples, the distance $D_4$ may be selected and/or determined such that the first travel path 306 will extend substantially centrally through the width $W_2$ as the paving machine 102 makes a first pass through the cut area 300 in the direction X. The distance $D_5$ may be selected and/or determined in a similar manner and/or for similar reasons. In still further examples, it is understood that the paving machine may make such a second pass in the direction X.

Operating the screed portion 124 and/or other components of the paving machine 102 as described with respect to FIG. 3 may further maximize efficiency and may further minimize irregularities and/or other deformities in the resulting mat 126.

FIG. 4 illustrates another example cut area 400 of the present disclosure. Similar to the cut area 300 illustrated in FIG. 3, the cut area 400 may be formed by a cold planer 152 (FIG. 1) on the work surface 160 (FIG. 1) to reveal the paving surface 118, and the paving machine 102 may be operated to deposit paving material 120 (e.g., a mat 126) on the paving surface 118 and within the cut area 400. As shown in FIG. 4, the example cut area 400 may include a first boundary 402 (e.g., a right-hand side boundary) and a second boundary 404 (e.g., a left-hand side boundary) disposed opposite and substantially parallel to the first boundary 402. While the cut area 300 described above with respect to FIG. 3 was substantially uniform in shape (e.g., substantially rectangular), the cut area 400 of FIG. 4 may include one or more inlets, outlets, curves, corners, and/or other features 408, 416 resulting in a cut area 400 having a shape and/or other configuration that is more irregular than the cut area 400.

For example, the cut area 400 may include a portion having a width $W_1$ (e.g., a nominal width) extending from the first boundary 402 to the second boundary 404. In such examples, substantially the entire cut area 400 (e.g., substantially the entire length of the cut area 400 except for the portions of the cut area 400 forming the features 408, 416) may have the width $W_1$. The cut area 400 may also include a centerline B extending substantially centrally (e.g., longitudinally) through substantially the entire cut area 400 (e.g., substantially the entire length of the cut area 400 except for the portions of the cut area 400 forming the features 408, 416) along the paving surface 118. Accordingly, except for the portions of the cut area 400 forming the features 408, 416, the centerline B of the cut area 400 may extend substantially centrally between the first boundary 402 and the second boundary 404.

In some examples of the present disclosure a travel path 407 of the cold planer 152 associated with the cut area 400 may extend substantially collinear with the centerline B of the cut area 400 for substantially the entire length of the cut area 400. In further examples, on the other hand, such as the example embodiment of FIG. 4, one or more travel paths of the cold planer 152 may diverge, at least in part, from the centerline B of the cut area 400. Such divergence of the travel path 407 from the centerline B of the cut area 400 may be illustrative of the need for the cold planer 152 to traverse various portions of the cut area 400, pivot, turn, veer left or right, and/or otherwise maneuver within the cut area 400 in order to form various features 408, 416 of the example cut area 400. In still further examples (e.g., examples in which two or more substantially parallel passes of the cold planer 152 are required to form a relatively wide cut area), multiple travel paths of the cold planer 152 may be offset from (e.g., may extend substantially parallel to) the centerline B of the cut area 400. In some examples, the cut area 400 may include one or more widths, shapes, features, contours, and/or other configurations formed by cold planer 152 as the cold planer 152 is controlled to traverse the work surface 160 in more than one pass and/or according to one or more additional (e.g., non-linear) travel paths.

As shown in FIG. 4, the example feature 408 may represent an outlet, off-ramp, merge area, or other configuration of the cut area 400. The feature 408 may include a first portion 410 extending outward and away from the centerline B of the cut area 400, a second portion 412 comprising a substantially central apex of the feature 408, and a third portion 414 extending inward from the second portion 412 and toward the centerline B of the cut area 300. In such examples, at least the second portion 412 of the feature 408 may define a width $W_2$ of the cut area 400 that is substantially equal to the sum of half of the width $W_1$ described above, and the distance $W_3$ extending axially outward from the second boundary 404 to the outermost edge of the second portion 412. Moreover, the example feature 416 may represent an inlet or other configuration of the cut area 400. The feature 416 may include a first portion 418 extending inward toward the centerline B of the cut area 400, a second portion 420 comprising a substantially central trough or base of the feature 416, and a third portion 422 extending from the second portion 420 away from the centerline B. In such examples, at least the second portion 420 of the feature 416 may define a width $W_4$ of the cut area 400 that is substantially equal to half of the width $W_1$ described above, less the distance $W_5$ extending axially inward from first second boundary 402 to the innermost edge of the second portion 420.

In example embodiments, the controller 148 of the paving machine 102 may receive one or more signals from the cold planer 152 (e.g., from the communication device 158 of the cold planer 152 and via the network 144) including information indicative of the one or more travel paths 407 traversed by the cold planer 152 to form the cut area 400 illustrated in FIG. 4. In some examples, one or more of the location sensors 170 associated with the cold planer 152 may measure, detect, sense, calculate, and/or otherwise determine GPS coordinates indicative of the location of the cold planer 152 as the cold planer 152 traverses the one or more travel paths 407. In such examples, the controller 156 of the cold planer 152 may control the communication device 158 to send one or more signals including such information to the controller 148, via the network 144, and the controller 148 may determine the location of the first boundary 402 and the location of the second boundary 404 based at least in part on such information. The controller 148 may also determine the location, shape, size, contours, extent, and/or other configurations of the features 416, 408 formed by the first and second boundaries 402, 404, respectively, based at least in part on such information. The controller 148 may further determine a location of the centerline B, a location of the one or more travel paths 407, and/or any other information indicative of a shape, size, depth, extent, and/or other configuration of the cut area 400 based at least in part on such information.

In further examples, one or more location sensors 170 associated with the cold planer 152 may determine a first plurality of sequential GPS coordinates indicative of the location of a first axially outermost edge of the rotor 162 of the cold planer 152 as the cold planer 152 traverses one or more of the travel path 407 and/or as the cold planer 152 forms the second boundary 404. One or more location sensors 170 associated with the cold planer 152 may also determine a second plurality of sequential GPS coordinates indicative of the location of a second axially outermost edge of the rotor 162 of the cold planer 152 as the cold planer 152 traverses one or more of the travel path 407 and/or as the cold planer 152 forms the first boundary 402. In such examples, the controller 156 of the cold planer 152 may control the communication device 158 to send one or more signals including such information to the controller 148, via the network 144, and the controller 148 may determine a location of the first boundary 402, a location of the second boundary 404, a location of the centerline B, a location of the one or more travel paths 407, and/or any other information indicative of a shape, size, depth, extent, and/or other configuration of the cut area 400 based at least in part on such information.

Thus, the information received by the controller 148 may be indicative of the location and/or extent of the first boundary 402, and of the location and/or extent of the second boundary 404. In any of the examples described herein, the controller 148 of the paving machine 102 may determine one or more travel paths 406 of the paving machine 102, associated with the cut area 400, based at least in part on such information. Further, as illustrated in FIG. 4, in some examples the controller 148 may also determine that a width $W_1$ and/or a maximum width (in the example of FIG. 4, such a maximum width may be equal to the sum of the width $W_1$ and the distance $W_3$ associated with the feature 408) of the cut area 400, extending from the first boundary 402 to the second boundary 404 is greater than a distance L (e.g., a maximum distance) between the first end gate 128 of the screed portion 124 and the second end gate 130. In such examples, the paving machine 102 may not be capable of forming a mat 126, extending from the first boundary 402 to the second boundary 404, in a single pass within the cut area 400.

Accordingly, in such examples, the controller 148 may generate and/or otherwise determine one or more travel paths 406 governing travel of the paving machine 102 within the cut area 400 that extend substantially parallel to the centerline B of the cut area 400. In some examples, as noted above with respect to FIG. 3, one or more such travel paths 406 may be spaced from the centerline B. In the example embodiment of FIG. 4, a first travel path 406 may be spaced from the centerline B by a distance $D_2$, and a second travel path may be spaced from the centerline B by a distance $D_3$ that is approximately equal to the distance $D_2$. In such examples, the controller 148 may cause the paving machine 102 to traverse the first travel path 406 as the paving machine 102 makes a first pass through the cut area 400 in the direction X, and may cause the paving machine 102 to traverse the second travel path as the paving machine 102 makes a second pass through the cut area 400 in the direction X' opposite the direction X. In still further examples, it is understood that the paving machine may make such a second pass in the direction X.

Further, in such examples the controller 148 may control the first end gate 128 and the second end gate 130 to be positioned at respective locations relative to the frame of the screed portion 124 as the paving machine 102 traverses the travel path 406 in the direction X, and/or as the paving machine 102 traverses one or more additional travel paths 406 (e.g., a travel path in the direction X'). For example, the controller 148 may be configured to determine one or more screed portion settings causing movement of the first end gate 128 and/or the second end gate 130 relative to the frame of the screed portion 124 based at least in part variations in the width, shape, extent, and/or other configurations of the cut area 400. By dynamically controlling the positions of the first end gate 128 and the second end gate 130 as the paving machine 102 traverses a substantially linear travel path 406, the controller 148 may enable the paving machine 102 to form a mat 126 having a width $D_1$ approximately equal to approximately half of the width $W_1$ at all locations along the travel path 406 upstream of the portion of the travel path 406 corresponding to the feature 408. In such examples, a substantially linear travel path 406 may be located, positioned, and/or otherwise configured such that as the paving machine 102 traverses the travel path 406 in the direction X upstream of the feature 408, the first end 208 of the screed portion 124 (e.g., the first end gate 128) may pass along, pass over, and/or be otherwise disposed substantially aligned with the centerline B of the cut area 400. Positioning the travel path 406 (and, as a result, the paving machine 102) in this way may enable the second end gate 130 to be moved, manipulated, positioned, located, and/or otherwise controlled such that the paving machine 102 may form a mat 126 covering the feature 408 while the paving machine 102 traverses the substantially linear travel path 406.

As can be envisioned from the example cut area 400 of FIG. 4, the controller 148 may cause the second end gate 130 to move in the direction Z away from the frame of the screed portion 124 as the paving machine 102 traverses a portion of the travel path 406 corresponding to the first portion 410 of the feature 408. The controller 148 may cause the second end gate 130 to maintain a constant position/location relative to the frame of the screed portion 124 as the paving machine 102 traverses a portion of the travel path 406 corresponding to the second portion 412 of the feature 408, and the controller 148 may cause the second end gate 130 to move in the direction Z' toward from the frame of the screed portion 124 as the paving machine 102 traverses a portion of the travel path 406 corresponding to the third portion 414 of the feature 408. During such a process, the controller 148 may cause the first end gate 128 to maintain a constant position/location relative to the frame of the screed portion 124 (e.g., a position corresponding to, aligned with, overlaying, and/or otherwise tracking the centerline B) as the paving machine 102 traverses the travel path 406, including the portions of the travel path 406 corresponding to the feature 408. Positioning the first and second end gates 128, 130 of the screed portion 124 in this way may enable the paving machine 102 to produce a mat 126 that is contoured to match the profile of the feature 408 while the paving machine 102 traverses the substantially linear travel path 406.

Moreover, the controller 148 may also control the first end gate 128 and the second end gate 130 to be positioned at respective locations relative to the frame of the screed portion 124 as the paving machine 102 (shown in phantom in FIG. 4) traverses a substantially linear travel path (e.g., a substantially linear travel path spaced from the centerline B by the distance $D_3$) in the direction X' opposite the direction X. Configuring the first end gate 128 and the second end gate 130 in this way may enable the paving machine 102 to form a mat 126 having a width $D_1$ substantially equal to half of the width $W_1$ at a portion of the travel path upstream of the feature 416 described above. As the paving machine 102 continues to traverse such a travel path in the direction X', the controller 148 may cause the second end gate 130 to move in the direction Z toward the frame of the screed portion 124 as the paving machine 102 traverses a portion of the travel path corresponding to the first portion 418 of the feature 416. The controller 148 may cause the second end gate 130 to maintain a constant position/location relative to the frame of the screed portion 124 as the paving machine 102 traverses a portion of the travel path corresponding to the second portion 420 of the feature 416, and the controller 148 may cause the second end gate 130 to move in the direction Z' away from the frame of the screed portion 124 as the paving machine 102 traverses a portion of the travel path corresponding to the third portion 422 of the feature 416. During such a process, the controller 148 may cause the first end gate 128 to maintain a constant position/location relative to the frame of the screed portion 124 (e.g., a position corresponding to, aligned with, overlaying, and/or otherwise tracking the centerline B) as the paving machine 102 traverses the travel path, including the portions of the travel path corresponding to the feature 416. Positioning the first and second end gates 128, 130 of the screed portion 124 in this way may enable the paving machine 102 to produce a mat 126 that is contoured to match the profile of the feature 416 while the paving machine 102 traverses a substantially linear travel path in the direction X'.

Operating the screed portion 124 and/or other components of the paving machine 102 as described with respect to FIG. 4 may further maximize efficiency and may further minimize irregularities and/or other deformities in the resulting mat 126.

Figure 5:
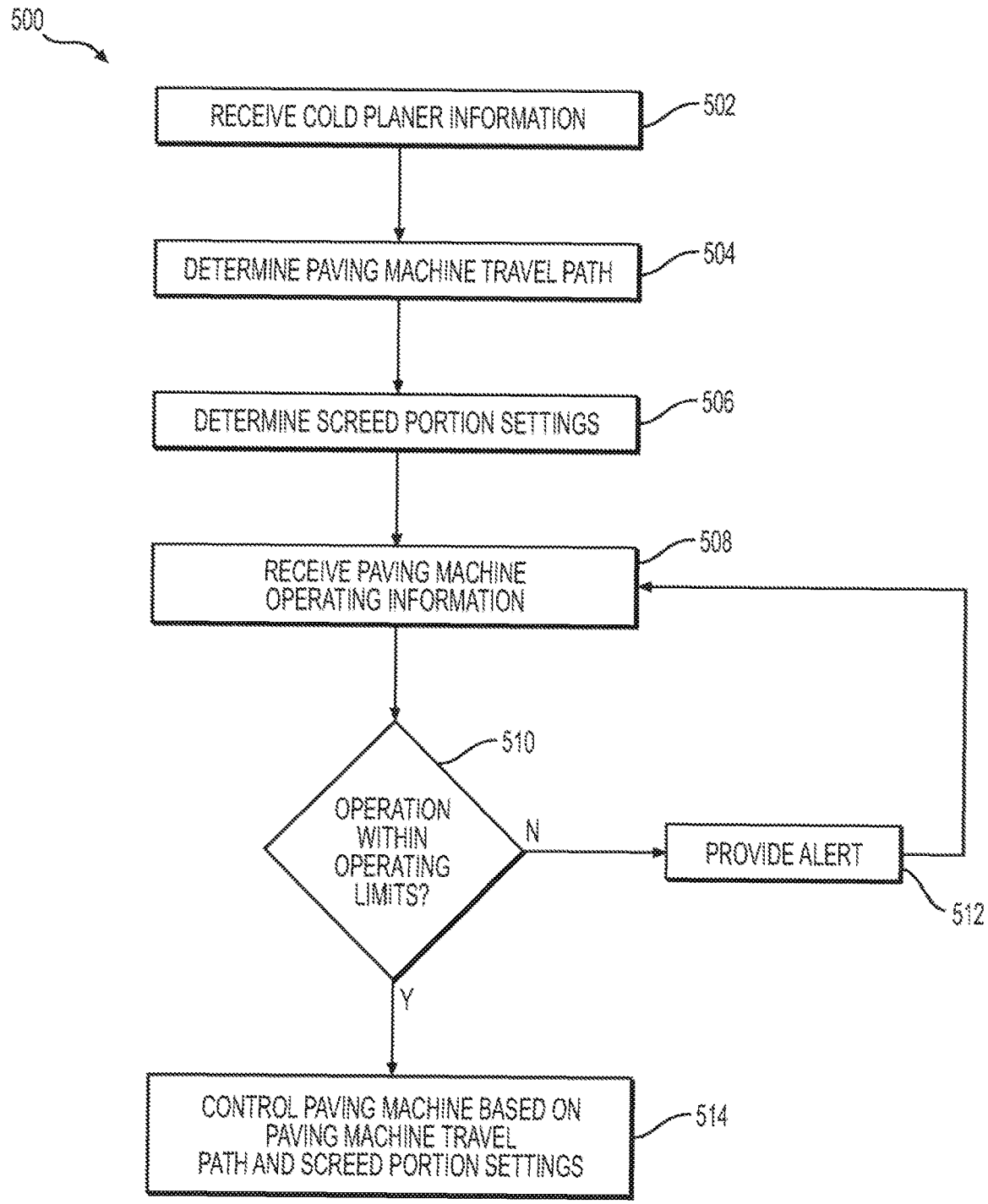
FIG. 5 is a flow chart depicting a method of controlling the operation of a paving machine in accordance with an example embodiment of the present disclosure.

FIG. 5 illustrates a flow chart depicting a method 500 in accordance with an example embodiment of the present disclosure. The example method 500 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 148 of the paving machine 102, the controller 156 of the cold planer 152, and/or other components of the paving system 100, such instructions may cause the controller 148, various components of the control system 200, and/or the paving machine 102, generally, to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 500 is described with reference to the paving system 100 and/or the paving machine 102 of FIG. 1.

At 502, the controller 148 of the paving machine 102 may receive various information from one or more sources associated with the paving system 100. For example, at 502 the controller 148 may receive information indicative of a cold planer travel path (e.g., the travel path 207 of the cold planer 152 described above with respect to at least FIG. 2). In some examples, at 502 the controller 148 of the paving machine 102 may receive one or more signals from the cold planer 152 (e.g., from the communication device 158 of the cold planer 152 and via the network 144) including information indicative of the travel path 207. As noted above with respect to at least FIG. 2, one or more of the location sensors 170 associated with the cold planer 152 may measure, detect, sense, calculate, and/or otherwise determine GPS coordinates indicative of the location of the cold planer 152 as the cold planer 152 traverses the travel path 207. In such examples, a location sensor 170 disposed on the cold planer 152 may determine a plurality of sequential GPS coordinates indicative of the location of the cold planer 152 continuously, substantially continuously, and/or at regular or irregular time intervals (e.g., every 0.5 seconds, every 1 second, every 2 seconds, every 5 seconds, every 10 seconds, every 15 seconds, and/or at any other regular or irregular time interval). In such examples, at 502 the controller 156 of the cold planer 152 may control the communication device 158 to send one or more signals including such information to the controller 148, via the network 144.

In some examples, upon receiving such information at 502 the controller 148 may determine a location of the first boundary 202, a location of the second boundary 204, a location of the centerline B, a location of the travel path 207, and/or any other information indicative of a shape, size, depth, extent, and/or other configuration of the cut area 200 based at least in part on such information. For example, at 502 the controller 148 may calculate the location and/or extent of the first boundary 202 based on the plurality of sequential GPS coordinates indicative of the location of the cold planer 152 as it traveled along the travel path 207, information indicating the particular location of the location sensor 170 on the frame or other portion of the cold planer 152, any known offsets or other calibration parameters corresponding to the particular location sensor 170, and length, width, diameter, position, and/or other dimensions of the rotor 162 used to form the cut area 200. In particular, at 502 the controller 148 may calculate a series of sequential GPS coordinates that, collectively, indicate the location and/or extent (e.g., length and/or direction) of the first boundary 202. In such examples, the controller 148 may employ one or more similar calculations or other processes to determine the location and/or extent of the second boundary 204, the centerline B, the travel path 207, and/or other items. Alternatively, it is understood that at 502 the controller 156 of the cold planer 152 may perform such operations.

In further examples, at least one first location sensor 170 associated with the cold planer 152 may determine a first plurality of sequential GPS coordinates indicative of the location of a first axially outermost edge of the rotor 162 of the cold planer 152 as the cold planer 152 traverses the travel path 207. At least one second location sensor 170 associated with the cold planer 152 may also determine a second plurality of sequential GPS coordinates indicative of the location of a second axially outermost edge of the rotor 162, opposite the first axially outermost edge of the rotor 162, as the cold planer 152 traverses the travel path 207. In such an example, the first and second location sensors 170 may make such measurements and/or other determinations continuously, substantially continuously, and/or at regular or irregular intervals. In such examples, at 502 the controller 156 of the cold planer 152 may control the communication device 158 to send one or more signals including such information to the controller 148, via the network 144. Upon receiving such information at 502, the controller 148 may determine a location of the first boundary 202, a location of the second boundary 204, a location of the centerline B, a location of the travel path 207, and/or any other information indicative of a shape, size, depth, extent, and/or other configuration of the cut area 200 based at least in part on such information. For example, at 502 the controller 148 may calculate the location and/or extent of the first boundary 202 based on the first and second pluralities of GPS coordinates, information indicating the respective locations of the first and second location sensors 170 on the frame or other portion of the cold planer 152, any known offsets or other calibration parameters corresponding to the first and second location sensors 170, and length, width, diameter, position, and/or other dimensions of the rotor 162 used to form the cut area 200. In particular, at 502 the controller 148 may calculate a series of sequential GPS coordinates that, collectively, indicate the location and/or extent (e.g., length and/or direction) of the first boundary 202. In such examples, the controller 148 may employ one or more similar calculations or processes to determine the location and/or extent of the second boundary 204, the centerline B, the travel path 207, and/or other items. Alternatively, it is understood that at 502 the controller 156 of the cold planer 152 may perform such operations. It is also understood that at 502, the controller 148 and/or the controller 156 may perform similar calculations or processes in example embodiments in which the cold planer 152 includes two or more rotors.

At 504, the controller 148 of the paving machine 102 may determine a paving machine travel path (e.g., the travel path 206 of the paving machine 102 described above with respect to at least FIG. 2) based at least in part on the information received at 502. In some examples, at 504 the controller 148 may also determine one or more additional operating parameters of the paving machine 102 based at least in part on the information received at 502, and such additional operating parameters may be used by the controller 148 to control the steering, speed, amount of paving material 120 deposited on the work surface 160, braking, and/or various operations of the paving machine 102. At 504, the controller 148 may generate and/or otherwise determine the travel path 206 of the paving machine 102 based at least in part on the GPS coordinates indicative of the location of the cold planer 152 as the cold planer 152 traverses the travel path 207, the first plurality of sequential GPS coordinates indicative of the location of the first axially outermost edge of the rotor 162, the second plurality of sequential GPS coordinates indicative of the location of the second axially outermost edge of the rotor 162, the cut depth of the cut area 200, and/or other information received at 502. In particular, at 504 the controller 148 may determine the location and/or extent of the first and second boundaries 202, 204 based on the various calculations and/or other processes noted above. As noted above, the controller 148 may also determine that a maximum width W of the cut area 200 is less than or equal to a maximum distance L between the first end gate 128 of the screed portion 124 and the second end gate 130 of the screed portion 124. In such examples the controller 148 may further determine that the maximum width W of the cut area 200 is greater than or equal to the minimum distance (e.g., the distance C) between the first end gate 128 and the second end gate 130. Based at least in part on such determinations, the controller 148 may, at 504, determine that the paving machine 102 is capable of forming a mat 126 having a width that is substantially equal to the maximum width W of the cut area 200 by traversing the cut area 200 in a single pass. As a result, at 504 the controller 148 may determine a travel path 206 of the paving machine 102 that extends substantially centrally between the first boundary 202 and the second boundary 204. Such an example travel path 206 may be substantially collinear with the centerline B of the cut area 200 and/or the travel path 207 of the cold planer 152.

As noted above with respect to at least FIGS. 3 and 4, in further examples the controller 148 may determine that a maximum width of the cut area is greater than a maximum distance L between the first end gate 128 of the screed portion 124 and the second end gate 130 of the screed portion 124. Based at least in part on such a determination, the controller 148 may, at 504, determine that the paving machine 102 is not capable of forming a mat 126 having a width that is substantially equal to the maximum width of the cut area by traversing the cut area in a single pass. As a result, at 504 the controller 148 may determine two or more travel paths of the paving machine 102 that extend substantially parallel to the centerline B of the cut area and/or substantially parallel to one or more travel paths of the cold planer 152. In some examples, the various travel paths of the paving machine 102 determined at 504 may be positioned, and/or otherwise configured so as to cause the first end gate 128 of the screed portion 124 to overlay, track, and/or otherwise remain substantially aligned with the centerline B of the cut area as the paving machine 102 traverses at least one of the travel paths. Alternatively, in further examples, the travel paths determined at 504 may be positioned and/or otherwise configured so as to facilitate any of the other alignment strategies described herein with respect to the first end gate 128, and/or the second end gate 130 of the screed portion 124.

At 506, the controller 148 may determine one or more screed portion settings based at least in part on the paving machine travel path determined at 504. For example, in embodiments similar to the embodiment of FIG. 2 in which the maximum width W of the cut area 200 is less than or equal to the maximum distance L between the first end gate 128 of the screed portion 124 and the second end gate 130 of the screed portion 124, and in which the maximum width W is greater than or equal to the minimum distance (e.g., the distance C) between the first end gate 128 and the second end gate 130, the controller 148 may determine various positions and/or movements of the first end gate 128 that are tailored such that the first end gate 128 may overlay, track, and/or otherwise remain substantially aligned with the first boundary 202 as the paving machine 102 traverses the travel path 206. Likewise, in such embodiments, the controller 148 may determine various positions and/or movements of the second end gate 130 that are tailored such that the second end gate 130 may overlay, track, and/or otherwise remain substantially aligned with the second boundary 204 as the paving machine 102 traverses the travel path 206. Further, in some examples the controller 148 may determine various positions and/or movements of the first and second end gates 128, 130 commensurate with aligning the travel path 206 of the paving machine 102 substantially along and/or parallel to the centerline B of the cut area 200. In such examples, the travel path 206 of the paving machine 102 may be spaced from the centerline B of the cut area 200.

Alternatively, in embodiments similar to the embodiments of FIGS. 3 and 4 in which the maximum width W of the cut area is greater than the maximum distance L between the first end gate 128 of the screed portion 124 and the second end gate 130, the controller 148 may determine one or more substantially linear travel paths positioned and/or otherwise configured to enable the paving machine 102 to form a continuous mat 126 while adjusting the various positions and/or movements of the first and second end gates 128, 130 to account for variations in the shape, size, profile, and/or other configurations of the first and second boundaries of the cut area. For example, with reference to the substantially rectangular cut area 300 of FIG. 3, in some situations the controller 148 may, at 506, determine various positions and/or movements of the first end gate 128 that are tailored such that the first end gate 128 will overlay, track, and/or otherwise remain substantially aligned with the centerline B of the cut area 300 as the paving machine 102 traverses a travel path 306 in the direction X. In such embodiments, the controller 148 may also determine various positions and/or movements of the second end gate 130 that are tailored such that the second end gate 130 will overlay, track, and/or otherwise remain substantially aligned with the second boundary 304 of the cut area 300 as the paving machine 102 traverses the travel path 306 in the direction X. At 506, the controller 148 may also make similar determinations defining various positions and/or movements of the first and second end gates 128, 130 associated with the paving machine 102 traversing one or more additional the travel paths 306 substantially parallel to the centerline B in the direction X'.

With reference to the cut area 400 of FIG. 4, in further embodiments the controller 148 may, at 506, determine various positions and/or movements of the first end gate 128 that are tailored such that the first end gate 128 will overlay, track, and/or otherwise remain substantially aligned with the centerline B of the cut area 400 as the paving machine 102 traverses a substantially linear travel path 406 in the direction X. In such embodiments, the controller 148 may also determine various positions and/or movements of the second end gate 130 that are tailored such that the second end gate 130 will overlay, track, and/or otherwise remain substantially aligned with the second boundary 404 of the cut area 400 as the paving machine 102 traverses the travel path 406 in the direction X. In such examples, the controller 148 may determine screed portion settings at 506 operable to cause movement of the second end gate 130 in the direction Z away from a frame of the screed portion 124 as the paving machine 102 traverses a portion of the travel path 406 corresponding to the first portion 410 of the feature 408. At 506, the controller 148 may also determine screed portion settings operable to cause the second end gate 130 to remain stationary relative to the frame of the screed portion 124 as the paving machine 102 traverses a portion of the travel path 406 corresponding to the second portion 412 of the feature 408, and the controller 148 may also determine screed portion settings operable to cause movement of the second end gate 130 in the direction Z' toward the frame of the screed portion 124 as the paving machine 102 traverses a portion of the travel path 406 corresponding to the third portion 414 of the feature 408. At 506, the controller 148 may also make similar determinations defining various positions and/or movements of the first and second end gates 128, 130 associated with the paving machine 102 traversing one or more additional the travel paths substantially parallel to the centerline B in the direction X'. For example, at 506 the controller 148 may make similar determinations defining various positions and/or movements of the first and second end gates 128, 130 associated with the paving machine 102 traversing one or more substantially linear travel paths corresponding to the first, second, and/or third portions 418, 420, 422 of the feature 416. In any of the examples described herein, at 506, the controller 148 may also determine one or more screed portion settings and/or other parameters (e.g., a modified travel path of the paving machine 102) based on one or more offset values stored in a memory and/or received from an operator of the paving machine 102.

In some examples, at 508 the controller 148 may receive one or more inputs from an operator of the paving machine 102, one or more comments from the operator, and/or other paving machine operating information from either the operator and/or from various other sources associated with the paving system 100. For example, at 508, the controller 148 may output visual indicia of at least one of the cut area 200, the first boundary 202, the second boundary 204, the centerline B, the cold planer travel path 207, the paving machine travel path 206, a location, orientation, movement, and/or other setting of the first end gate 128, a location, orientation, movement, and/or other setting of the second end gate 130, the mat 126, the paving surface 118, the work surface 160, a location of the paving machine 102, and/or other operational information via the console 134 of the paving machine 102. In some examples, such visual indicia may comprise one or more images, icons, maps, and/or other content that is provided via a display of the console 134. In still further examples, outputting such visual indicia may include providing at least a portion of such information to at least one of the control system 144 and/or the electronic device 142 via the network 144.

At 508, the controller 148 may also request operating information from the operator via the console 134. For example, at 508 the controller 148 may provide one or more requests that the operator approve one or more of a paving machine travel path 206 (e.g., a proposed paving machine travel path), a location, orientation, movement, and/or other setting of the first end gate 128, a location, orientation, movement, and/or other setting of the second end gate 130, one or more offsets associated with the first end gate 128, and/or the second end gate 130, one or more offsets (e.g., an offset relative to the centerline B of the cut area) associated with one or more corresponding paving machine travel paths, and/or other information associated with operating the paving machine 102. Thus, at 508, the controller 148 may receive one or more inputs from the operator in response to such requests. Such inputs may comprise approval of the information provided via the console 134 of the paving machine 102. Alternatively, such inputs may comprise rejection of and/or modification/correction of the information provided via the console 134 of the paving machine 102.

At 510, the controller 148 may determine whether one or more of the inputs received from the operator and/or any other operating information received at 508 would require the screed portion 124, and/or any other components of the paving machine 102 to exceed an operating limit. For example, in some situations at 508 an operator may provide an offset request associated with the first end gate 128, the second end gate 130, and/or the travel path 206. At 510, the controller 148 may determine whether, for example, operating the first end gate 128 in accordance with the requested offset value would hinder the ability of the paving machine 102 to deposit a mat 126 covering an entire feature (e.g., a feature 408, 416) of the cut area in which the paving machine 102 is operating. In examples in which, at 510, the controller 148 determines that controlling operation of one or more components of the paving machine 102 based at least in part on operating information received at 508 will require such components of the paving machine 102 to exceed an operating limit (510—No), the controller 148 may, at 512, provide a visible, audible, tactile, and/or other alert, via the console 134, based at least in part on such a determination. Alternatively, in examples in which, at 510, the controller 148 determines that controlling operation of one or more components of the paving machine 102 based at least in part on operating information received at 508 will result in the paving machine 102 and/or such components operating within a predetermined operating limit (510—No), the controller 148 may proceed to 514.

At 514, the controller 148 may control the paving machine 102 based at least in part on the paving machine travel path determined at 504 and/or the screed portion settings determined at 506. For example, at 514 the controller 148 may control the paving machine 102 to traverse the travel path 206 determined at 504. At 514, the controller 148 may also control the first end gate 128, second end gate 130, one or more respective actuators 131, and/or other components of the screed portion 124 to deposit paving material 120 within the cut area 200, based at least in part on the one or more screed portion settings determined at 506, as the paving machine 102 traverses at least a portion of the travel path 206. As noted above, in some examples, the controller 148 may provide for autonomous and/or semi-autonomous control of the paving machine 102 at 514.

INDUSTRIAL APPLICABILITY

The present disclosure provides systems and methods for controlling various operations of a paving machine at a worksite such as a construction site, a road repair zone, and/or other such site. The various systems and methods described herein may be used to to achieve improved paving performance and efficiency. Additionally, such systems and methods may be used reduce the safety risk and cost associated with human operation of such paving machines. As noted above with respect to FIGS. 1-5, an example method of the present disclosure may include receiving information indicative of a cold planer travel path extending substantially centrally through a cut area formed by a cold planer 152 on a work surface of the worksite. Such a method may also include determining, with a controller 148 of a paving machine 102 and based at least in part on the received information, a paving machine travel path within the cut area. Additionally, the controller 148 may determine a first location of a first screed end gate 128 of the paving machine 102 based at least in part on the paving machine travel path. The controller 148 may also determine a second location of a second screed end gate 130 based at least in part on the paving machine travel path. The controller 148 may also be configured to control the paving machine 102 to traverse the paving machine travel path, and to control a screed portion 124 of the paving machine 102 to deposit paving material 102 within the cut area with the first end gate 128 disposed at the first location and the second end gate 130 disposed at the second location, as the paving machine 102 traverses at least a portion of the paving machine travel path.

In any of the examples described herein, the controller 148 may be configured to provide one or more of the travel paths, screed portion settings, locations of the first and second end gates 128, 130, and/or any other such information, to an operator of the paving machine 102 via one or more consoles 134 of the paving machine. As a result, an operator of the paving machine 102 may consume such information during one or more paving operations, and may utilize such information to modify various paving parameters of the paving machine 102. Additionally or alternatively, the operator and/or the controller 148 may provide any such information to one or more other machines associated with the paving system 100 such that the operating parameters associated with such machines can be optimized. The controller 148 may also be configured to provide such information to a mobile device used by, for example, a foreman at the worksite and/or to a control system or other computing device located remote from the worksite. Such information may be used by, for example, the foreman to improve the efficiency of various paving activities at the worksite. Thus, the example systems and methods described above may provide considerable cost savings, safety improvements, and paving efficiency improvements. The example systems and methods described herein may also reduce the time and labor required for various paving activities at the worksite.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A method, comprising:
receiving information indicative of a cold planer travel path, the cold planer travel path extending substantially centrally through a cut area formed by a cold planer on a work surface;

determining a paving machine travel path within the cut area based at least in part on the information;
determining a screed portion setting based at least in part on the paving machine travel path;
controlling a paving machine to traverse the paving machine travel path; and
controlling a screed portion of the paving machine to deposit paving material within the cut area, based at least in part on the screed portion setting, as the paving machine traverses at least a portion of the paving machine travel path.

2. The method of claim 1, wherein the information comprises:
a first plurality of global positioning system (GPS) coordinates indicating sequential locations of a first axially outermost edge of a rotor of the cold planer, and
a second plurality of GPS coordinates indicating sequential locations of a second axially outermost edge of the rotor opposite the first axially outermost edge.

3. The method of claim 1, wherein the information comprises a plurality of sequential GPS coordinates determined by location sensors disposed on the cold planer, the method further comprising:
determining a first boundary of the cut area based at least in part on the plurality of sequential GPS coordinates; and
determining a second boundary of the cut area opposite the first boundary based at least in part on the plurality of GPS coordinates.

4. The method of claim 1, wherein the screed portion of the paving machine includes a first end gate and a second end gate opposite the first end gate, the screed portion setting comprising a first location of the first end gate relative to a frame of the screed portion, and a second location of the second end gate relative to the frame of the screed portion.

5. The method of claim 1, further comprising:
determining that a maximum width of the cut area, extending from a first boundary of the cut area to a second boundary of the cut area opposite the first boundary, is less than or equal to a maximum distance between a first end gate of the screed portion and a second end gate of the screed portion opposite the first end gate;
determining that the maximum width of the cut area is greater than or equal to a minimum distance between the first end gate and the second end gate; and
causing the paving machine travel path to extend substantially collinear with the cold planer travel path based at least in part on determining that:
the maximum width of the cut area is less than or equal to the maximum distance, and
the maximum width of the cut area is greater than or equal to the minimum distance.

6. The method of claim 1, further comprising:
outputting visual indicia of at least one of the cold planer travel path or the paving machine travel path via a console of the paving machine; and
requesting operating information, via the console, associated with at least one of the paving machine travel path or the screed portion setting.

7. The method of claim 6, further comprising:
receiving operating information via the console;
determining that controlling operation of the screed portion based at least in part on the operating information will require the screed portion to exceed an operating limit; and
providing an alert, via the console, based at least in part on determining that controlling operation of the screed portion based at least in part on the operating information will require the screed portion to exceed the operating limit.

8. The method of claim 1, wherein the paving machine travel path comprises a first travel path of the paving machine extending substantially centrally, in a first direction, between a centerline of the cut area and a first boundary of the cut area, the method further comprising:
determining that a maximum width of the cut area, extending from the first boundary to a second boundary of the cut area opposite the first boundary, is greater than a maximum distance between a first end gate of the screed portion and a second end gate of the screed portion opposite the first end gate; and
determining a second travel path of the paving machine extending substantially centrally, in a second direction opposite the first direction, between the centerline and the second boundary.

9. The method of claim 8, further comprising causing the paving machine to traverse the first travel path such that the first end gate is maintained substantially along the centerline of the cut area, and wherein controlling operation of the screed portion based at least in part on the screed portion setting comprises:
positioning the second end gate at a first location relative to a frame of the screed portion as the paving machine traverses a first portion of the first travel path corresponding to a portion of the cut area having a first width;
moving the second end gate to a second location, further from the frame of the screed portion than the first location, as the paving machine traverses a second portion of the first travel path corresponding to a portion of the cut area having a second width greater than the first width; and
maintaining the first end gate at a constant location relative to the frame of the screed portion as the paving machine traverses the first and second portions of the first travel path.

10. The method of claim 8, further comprising causing the paving machine to traverse the first travel path such that the first end gate is maintained substantially along the centerline of the cut area, and wherein controlling operation of the screed portion based at least in part on the screed portion setting comprises:
positioning the second end gate at a first location relative to a frame of the screed portion as the paving machine traverses a first portion of the first travel path corresponding to a portion of the cut area having a first width;
moving the second end gate to a second location, closer to the frame of the screed portion than the first location, as the paving machine traverses a second portion of the first travel path corresponding to a portion of the cut area having a second width less than the first width; and
maintaining the first end gate at a constant location relative to the frame of the screed portion as the paving machine traverses the first and second portions of the first travel path.

11. A paving system, comprising:
a cold planer having a location sensor and a communication device; and
a paving machine having
a screed portion, and a controller in communication with the communication device, the controller configured to:
receive information from the communication device determined by the location sensor, wherein the information is indicative of a cold planer travel path extending substantially centrally through a cut area formed by the cold planer on a work surface;
determine a paving machine travel path within the cut area based at least in part on the information;
determine a screed portion setting based at least in part on the paving machine travel path;
control the paving machine to traverse the paving machine travel path; and
control the screed portion to deposit paving material within the cut area, based at least in part on the screed portion setting, as the paving machine traverses at least a portion of the paving machine travel path.

12. The system of claim 11, wherein the location sensor comprises
a first location sensor configured to determine a first plurality of GPS coordinates indicating sequential locations of a first axially outermost edge of a rotor of the cold planer, and
a second location sensor configured to determine a second plurality of GPS coordinates indicating sequential locations of a second axially outermost edge of the rotor opposite the first axially outermost edge,
the controller being configured to determine the paving machine travel path based at least in part on the first plurality of GPS coordinates and the second plurality of GPS coordinates.

13. The system of claim 11, wherein the controller is configured to:
determine a boundary of the cut area based at least in part on the information; and
cause an end gate of the screed assembly to be maintained along the boundary of the cut area as the paving machine traverses the paving machine travel path.

14. The system of claim 11, wherein the communication device comprises a first communication device, the paving machine further comprising a second communication device operably connected to the controller and in communication with the first communication device of the cold planer via a network.

15. The system of claim 14, wherein the controller is in communication with at least one of a remote control system or a mobile device via the network, the controller being configured to provide at least one of the paving machine travel path or the screed portion setting to the at least one of the remote control system or the mobile device via the network.

16. A paving machine, comprising:
a hopper adapted to receive paving material;
an auger assembly;
a conveyor system adapted to convey the paving material from the hopper to the auger assembly, wherein the auger assembly is adapted to provide the paving material received from the conveyor system to a screed portion of the paving machine, the screed portion including a first end gate and a second end gate opposite the first end gate;
a communication device configured to determine a location of the paving machine; and a controller in communication with the communication device, the controller configured to:
receive information indicative of a cold planer travel path extending substantially centrally through a cut area formed by the cold planer on a work surface;
determine a paving machine travel path within the cut area based at least in part on the information;
determine a first location of the first end gate based at least in part on the paving machine travel path;
determine a second location of the second end gate based at least in part on the paving machine travel path;
control the paving machine to traverse the paving machine travel path; and
control the screed portion to deposit paving material within the cut area, with the first end gate disposed at the first location and the second end gate disposed at the second location, as the paving machine traverses at least a portion of the paving machine travel path.

17. The paving machine of claim 16, wherein the screed portion comprises:
a first actuator operably connected to the controller and configured to movably dispose the first end gate at the first location, and
a second actuator operably connected to the controller and configured to movably dispose the second end gate at the second location.

18. The paving machine of claim 16, wherein the controller is configured to:
output visual indicia of at least one of the cold planer travel path or the paving machine travel path via a console of the paving machine; and
request operating information, via the console, associated with the paving machine travel path, the first location of the first end gate, or the second location of the second end gate.

19. The paving machine of claim 16, wherein the controller is configured to:
determine that a maximum width of the cut area, extending from a first boundary of the cut area to a second boundary of the cut area opposite the first boundary, is less than or equal to a maximum distance between the first end gate and the second end gate;
determine that the maximum width of the cut area is greater than or equal to a minimum distance between the first end gate and the second end gate; and
cause the paving machine travel path to extend substantially collinear with the cold planer travel path based at least in part on determining that
the maximum width of the cut area is less than or equal to the maximum distance, and
the maximum width of the cut area is greater than or equal to the minimum distance.

20. The paving machine of claim 16, wherein the controller is configured to cause visual indicia of at least part of the paving machine travel path to be displayed via a console of the paving machine, and to provide the paving machine travel path to a remote control system via a network.

* * * * *